United States Patent
Eray et al.

(10) Patent No.: US 8,378,911 B2
(45) Date of Patent: *Feb. 19, 2013

(54) ELECTRONIC ENTITY WITH MAGNETIC ANTENNA

(75) Inventors: Yves Eray, Thorigne Fouillard (FR); Guy Enouf, Saint-Sylvain (FR)

(73) Assignee: Oberthur Technologies, Levallois-Perret (FR)

( * ) Notice: Subject to any disclaimer, the term of this patent is extended or adjusted under 35 U.S.C. 154(b) by 851 days.

This patent is subject to a terminal disclaimer.

(21) Appl. No.: 11/920,970

(22) PCT Filed: May 24, 2006

(86) PCT No.: PCT/FR2006/001188
§ 371 (c)(1),
(2), (4) Date: Jun. 10, 2009

(87) PCT Pub. No.: WO2006/125916
PCT Pub. Date: Nov. 30, 2006

(65) Prior Publication Data
US 2009/0315799 A1    Dec. 24, 2009

(30) Foreign Application Priority Data
May 25, 2005   (FR) ...................................... 05 05279

(51) Int. Cl.
*H01Q 7/08* (2006.01)
(52) U.S. Cl. ........................................ 343/788; 343/866
(58) Field of Classification Search .................. 343/788, 343/742, 741, 866, 867, 702, 895
See application file for complete search history.

(56) References Cited

U.S. PATENT DOCUMENTS

| | | | |
|---|---|---|---|
| 4,804,915 A * | 2/1989 | Hoenig | 324/248 |
| 6,774,865 B1 | 8/2004 | Serra | |
| 7,119,743 B2 | 10/2006 | Iguchi et al. | |
| 7,830,324 B2 * | 11/2010 | Eray | 343/788 |
| 2002/0135523 A1 | 9/2002 | Romero et al. | |
| 2003/0019941 A1* | 1/2003 | Altwasser et al. | 235/492 |
| 2006/0050008 A1 | 3/2006 | Morand et al. | |
| 2007/0018649 A1* | 1/2007 | Prsha et al. | 324/326 |
| 2007/0271467 A1 | 11/2007 | Ayala et al. | |

FOREIGN PATENT DOCUMENTS

| | | |
|---|---|---|
| DE | 196 10 284 A1 | 8/1997 |
| EP | 0149240 | 7/1985 |
| EP | 886239 | 12/1998 |
| FR | 2724263 | 3/1996 |
| FR | 2769390 | 4/1999 |
| FR | 2812482 | 2/2002 |
| FR | 2 815 176 A | 4/2002 |
| GB | 2293050 | 3/1996 |

(Continued)

OTHER PUBLICATIONS

Chinese Office Action, dated Oct. 17, 2012, from corresponding CN application.

*Primary Examiner* — Hoanganh Le
(74) *Attorney, Agent, or Firm* — Young & Thompson (57) ABSTRACT

An electronic entity (2) includes an electronic circuit (4) having connected thereto an antenna. The antenna includes a loop (6) electrically connected to the electronic circuit (4) and a resonator (8) coupled with the loop (6). The resonator (8) can be capacitively coupled to the loop. The resonator can be formed from a turn facing the loop (6) over at least a portion of its perimeter.

22 Claims, 7 Drawing Sheets

FOREIGN PATENT DOCUMENTS

| | | |
|---|---|---|
| JP | 63-260225 A | 10/1988 |
| JP | 4-296998 A | 10/1992 |
| JP | 8222937 A | 8/1996 |
| WO | 98/08190 | 2/1998 |
| WO | 03/096478 A1 | 11/2003 |
| WO | 2004/109857 A1 | 12/2004 |

* cited by examiner

ELECTRONIC ENTITY WITH MAGNETIC ANTENNA

BACKGROUND OF THE INVENTION

1. Field of the Invention

The invention concerns an electronic entity with a magnetic antenna.

2. Description of the Related Art

Electronic entities of this type generally comprise an electronic circuit having in particular two terminals to which is connected a magnetic antenna generally formed of a winding of several turns produced in conductive material.

This type of electronic entity includes in particular contactless microcircuit cards (where the magnetic antenna constitutes the only means of communication of the microcircuit with the exterior) and so-called "dual" or "hybrid" microcircuit cards (where electrical contacts are provided on one face of the card that provide an alternative mode of communication of the microcircuit with the exterior). In microcircuit cards of either type, the turns of the magnetic antenna are generally produced in the form of windings of copper wire or conductive tracks, in both cases disposed within the layers physically constituting the card.

In all cases, to increase the induced current that the magnetic antenna delivers to the electronic circuit, the designer of the electronic entity is constrained to increase the number of turns in order to increase the magnetic flux through the antenna.

Increasing the number of turns rapidly leads to problems, however: on the one hand, the increase of the area that carries the turns relative to the available area can cause problems of congestion, all the more so in that the geometry of the turns is relatively fixed, which is a particular nuisance in the case of electronic entities with small dimensions; on the other hand, the small number of areas generally available to receive the turns (often deposited in the same plane, for example) make bridging techniques necessary for the looping of the electrical circuit, as described for example in patent application FR 2 769 390.

SUMMARY OF THE INVENTION

The invention aims to limit these problems and therefore to propose an electronic entity with a magnetic antenna, the design of which facilitates integration of the antenna into the electronic entity, for example through greater freedom in its design and a reduction of its area, without its compromising performance.

The invention therefore proposes an electronic entity comprising an electronic circuit to which is connected an antenna, characterized in that the antenna comprises a loop electrically connected to the electronic circuit and a resonator formed of a conductive winding with free ends coupled to said loop.

The introduction of the resonator coupled to the loop on the one hand amplifies the electrical signals passing through it and on the other hand provides greater flexibility in the design of the antenna.

The resonator is capacitively coupled to the loop, for example, for particularly beneficial operation of the antenna, as explained hereinafter.

To this end, the resonator comprises a turn facing the loop over at least a portion of its perimeter, for example.

To maximize the capacitive coupling, the turn faces the loop over virtually all its perimeter and/or the turn and the loop are at a distance less than 0.5 mm over said perimeter portion.

According to one implementation possibility, the resonator can comprise a plurality of turns. In this case, in order to obtain a particularly efficient resonator, the turns are separated two by two by a distance less than 0.5 mm.

According to one possible embodiment, the loop is inside the resonator. According to another embodiment, the resonator is inside the loop.

The loop and the resonator can be deposited on the same flat support.

Alternatively, the loop is produced in a first plane, the resonator is produced in a second plane different from the first plane, and the resonator is situated in line with the loop, for example a median turn of the resonator is placed in line with the loop to obtain particularly efficient coupling.

For example, the resonant frequency of the resonator alone (or no-load resonator frequency) is at most 10% higher than a communication frequency of the electronic circuit with the exterior devices (for example a contactless reader). Thus the coupling of the loop involving a resonant frequency of the circuit as a whole slightly lower than the resonant frequency of the resonator alone, the resonant frequency of the circuit as a whole is particularly suitable for profiting from the amplification phenomenon.

The antenna considered here is a magnetic antenna, i.e. an antenna that essentially generates an induction current.

The electronic circuit functions at a communication frequency below 100 MHz, for example.

Said communication frequency can be between 1 MHz and 50 MHz, for instance, in particular between 13 MHz and 15 MHz.

In this latter case, the resonant frequency of the resonator alone can then advantageously be between 13.6 MHz and 17 MHz.

The exterior dimensions of the electronic entity are less than 100 mm, for example, or even less than 30 mm. The resonator is particularly beneficial in these conditions where the available area is small.

The resonator can then advantageously comprise more than ten turns.

The electronic entity can therefore be a pocket electronic entity. It is a microcircuit card, for example. In this case, the antenna can advantageously extend over only around half the area of the card.

BRIEF DESCRIPTION OF THE DRAWING FIGURES

Other features and advantages of the invention will become apparent in the light of the following description, given with reference to the appended drawings, in which.

DETAILED DESCRIPTION OF THE INVENTION

Figure 1:
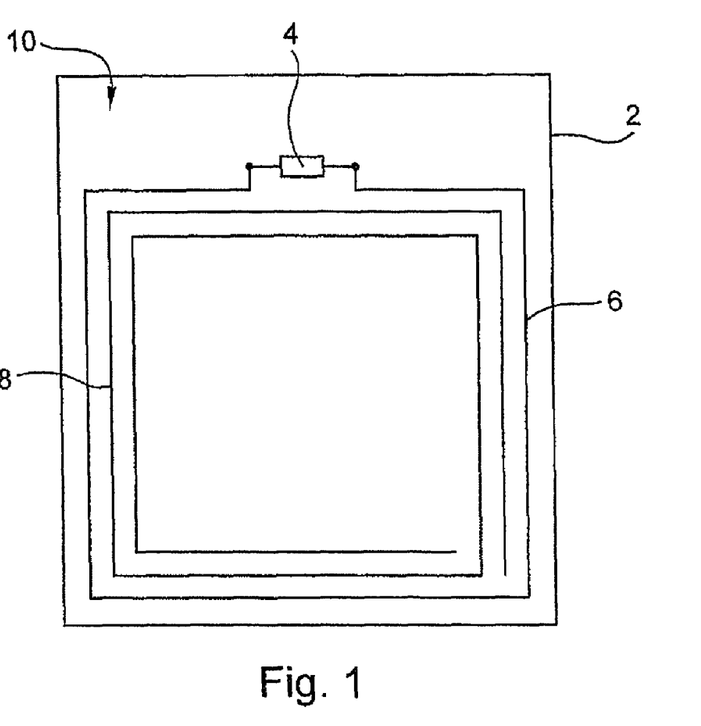
FIG. 1 represents a first example of an electronic entity produced in accordance with the teachings of the invention.

FIG. 1 represents diagrammatically a first example of an electronic entity produced in accordance with the teachings of the invention. Here it is a microcircuit card 2, the elements whereof essential to understanding the invention have been represented, namely an electronic circuit 4 (such as an integrated circuit) to the terminals of which is connected an antenna formed on the one hand by a loop 6 and on the other hand by a resonator 8.

For example, the electronic circuit 4 is received in a module that has just been deposited on the electronic entity 2 in order to make the connection of the electronic circuit 4 to the antenna (here in practice to the loop 6), for example as described in the document FR 2 863 747.

The antenna enables the electronic circuit 4 to communicate at a distance with other electronic devices such as a card reader, for example. The antenna is a magnetic antenna not only for exchange of information between the electronic circuit 4 and the exterior electronic device at a predetermined frequency but also to provide a remote power feed to the electronic circuit 4.

For portable pocket electronic entities of everyday size (namely dimensions of the order of 10 cm or less), which exchange information with a range of the order of 1 meter, or even a few meters, such an antenna functions through a magnetic field (i.e. at a distance at most of the order of the wavelength) at frequencies up to around 100 MHz (at which the wavelength is 3 m).

The electronic entity 2 described here is a contactless type card, for example, which can exchange information with an exterior electronic device, for example according to the ISO standard 14 443, on a 13.56 MHz carrier.

Here the loop 6 is produced by a single turn and therefore forms, as already indicated, a conductive circuit connected at each of its ends to one of the terminals of the electronic circuit 4.

For example, the loop 6 is produced by etching a copper track on a support 10 produced in a dielectric material that constitutes a layer of the electronic entity 2, in particular in the case described here where the electronic entity is a microcircuit card. Other embodiments of the loop 6 can naturally be envisaged, such as depositing a copper wire or a conductive ink, for example.

The resonator 8, also formed here by conductive tracks (for example obtained by etching copper with a width of about 0.15 mm, for example between 0.12 mm and 0.2 mm, and a spacing of about 0.15 mm, for example between 0.12 mm and 0.2 mm), is disposed at a sufficiently small distance from the latter to enable capacitive coupling between these two elements.

In the example represented in FIG. 1, the resonator 8 is formed of rectilinear portions that form a conductive spiral with free ends, formed of two turns in the case described.

One of the turns of the resonator 8 (the exterior turn in FIG. 1) faces the loop 6, over at least a substantial portion of its perimeter (here virtually all the latter), and at a small distance (i.e. less than 0.5 mm and for example less than 0.15 mm) from the latter in order to ensure good capacitive coupling.

Alternatively, the proximity of the turn of the resonator 8 and the loop 6 can take place over only a portion of their perimeter (for example of the order of half of the latter), which ensures sufficient capacity coupling in certain cases.

According to another variant, the capacitive coupling could be produced by connecting the loop 6 and the resonator 8 by means of a capacitor.

The disposition of the resonator 8 in the form of turns generates an inductive behavior of that element, while the proximity of the portions (here rectilinear) of the spiral two by two and the absence of looping (because of the free ends of the spiral) induces a capacitive behavior.

The resonator therefore has a high Q at a resonant frequency.

This Q at resonance will advantageously be used to amplify, at the communication frequency used, the signals to which the resonator is subjected. Those amplified signals are transmitted to the loop by capacitive coupling. To this end, the resonator 8 is designed (in terms of the disposition of these tracks, their width and the spacing between them, and in terms of the materials used for the resonator 8 and the support 10) in order to have inductive and capacitive effects that cause a resonance at a frequency close to the communication frequency of the electronic circuit, as illustrated in the examples described hereinafter.

For the calculation of the values of inductance and capacitance generated for given characteristics of the resonator, see for example the documents "Inductance Calculation Techniques, part II: Calculations and Handbook Methods", by Marc T. Thompson, in Power Control and Intelligent Motion, December 1999, "Design and Optimization of a 10 nH Square-Spiral Inductor for Si RF ICs", by Tuan Huu Bui, University of North Carolina, October 1999, "Capacity Limits and Matching Properties of Integrated Capacitors", by Robert Aparicio and Ali Hajirniri, in IEEE Journal of Solid State Circuits, Vol. 37 No. 3, March 2002, "Interdigital sensors and transducers" by Alexander V. Mamishev et al., in Proceedings of the IEEE, Vol. 92, No. 5, May 2004 and "Be Careful of Self and Mutual Inductance Formulae", by H. Kim and C. C-P. Chen, University of Wisconsin, Madison, 2001.

The use of a plurality of turns in the resonator, as is the case the embodiment of the invention shown in FIG. 1, not only increases the inductive effect by increasing the length of the conductor used, but also the capacitive effect through the cooperation of each rectilinear portion of the resonator 8 with another rectilinear portion of the latter.

Moreover, as for the loop 6, there are numerous possibilities for implementation of the resonator 8 other than the conductive material tracks, for example the use of a copper wire (between 0.088 mm and 0.15 mm wide and with a spacing between 0.112 mm and 0.2 mm) or the deposition of a conductive ink (between 0.15 mm and 0.3 mm wide and with a spacing between 0.3 mm and 0.5 mm).

Finally, although rectilinear portions are imposed on the resonator specified by way of example hereinabove, clearly curved portions could be used instead.

Figure 2:
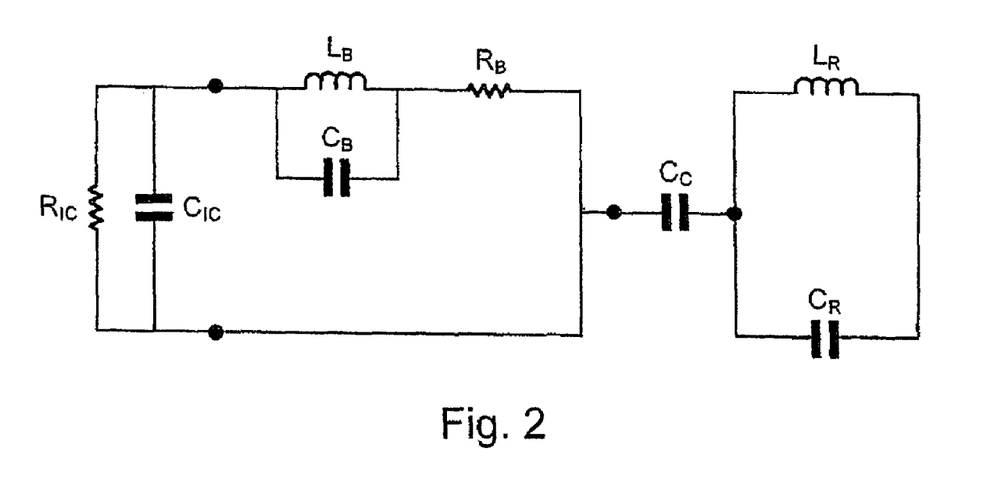
FIG. 2 represents an equivalent electronic circuit for modeling the general principles of the electrical behavior of the electronic entity from FIG. 1.

There is represented in FIG. 2 one possible equivalent electric circuit diagram for modeling the general principles of the electrical behavior of the electronic entity from FIG. 1, which clearly explains the electrical operation of the latter.

The electronic circuit 4 is represented in the standard way by a resistor $R_{IC}$ and a capacitor $C_{IC}$ in parallel. In the case where the electronic circuit is an integrated circuit, this data is generally supplied by the fabricator of the electronic circuit, or can be measured.

The loop 6 is mainly represented by the series combination of an inductor $L_B$ and a resistor $R_B$. To model also cases where the loop 6 is formed of a plurality of turns, there is also provided an inter-turn capacitor $C_B$ connected in parallel with the inductance $L_B$ of the loop 6.

The resonator 8 is represented by an LC circuit that combines an inductor $L_R$ and a capacitor $C_R$ the physical origin of which is explained hereinafter.

As indicated with reference to FIG. 1, the loop 6 and the resonator 8 are associated by capacitive coupling, which is represented in the FIG. 2 equivalent circuit diagram by the connection of the portion representing the loop 6 (primarily inductor $L_B$ and resistor $R_B$) to the portion representing the resonator 8 (inductor $L_R$ and capacitor $C_R$) via a capacitor $C_C$ corresponding to the capacitive coupling.

Figure 3:
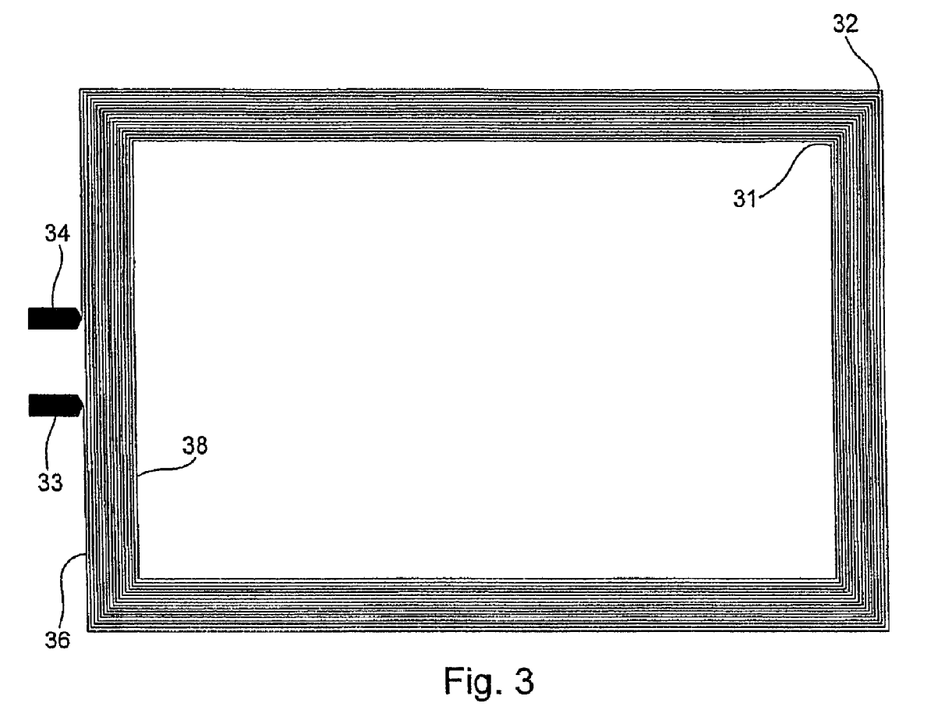
FIG. 3 represents an antenna used in a second embodiment of the invention.

FIG. 3 represents a second example of an antenna conforming to the teachings of the invention, which is naturally associated with an electronic circuit as has already been described with reference to FIG. 1 to form an electronic entity of the microcircuit card type.

This kind of antenna is adapted here to an ID1 type card with dimensions 85.6 mm×54 mm.

The antenna represented in FIG. 3 comprises a loop 36 formed by a single turn (intended to be connected at each of its ends to the electronic circuit) and a resonator 38 formed by about fifteen turns, the winding formed by these turns having free ends 31, 32.

All the elements of the antenna, namely the loop 36 and the resonator 38, are here formed in the same plane, for example by deposition on a support in a dielectric material, for example paper or a plastic material (of relative permittivity between 2 and 7).

The conductive tracks are here produced in copper by etching.

This embodiment, produced here for a card with dimensions 81 mm×50 mm, produces a resonator capacitance $C_R$ of 0.6165 pF and a resonator inductance $L_R$ of 219.7 µH, which defines a no-load resonant frequency (i.e. of the resonator alone) of 13.678 MHz. The coupling with the loop having the effect of very slightly reducing the resonant frequency compared to the unloaded resonator, the antenna is particularly beneficial for a microcircuit card whose electronic circuit communicates with the exterior at a frequency of 13.56 MHz (for example a PHILIPS MIFAR PRO X electronic circuit).

The loop 36 is naturally terminated at each end intended to be connected to the electronic circuit by a connection land 33, 34.

Because of the use of a single turn for the loop 36 and a winding with free ends (i.e. with no looping) for the resonator circuit 38, the antenna proposed in FIG. 3 does not necessitate the use of a bridge. However, thanks to the use of the resonator, its magnetic performance is particularly good.

Figure 4:
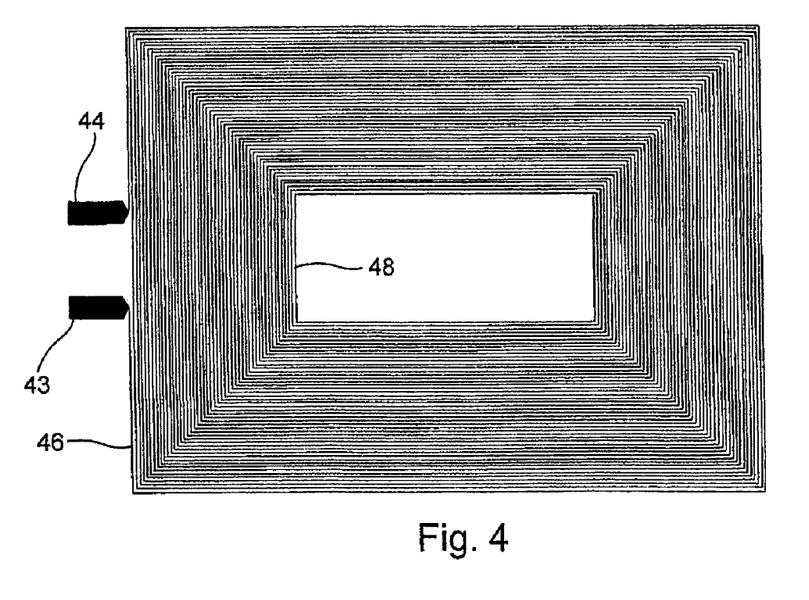
FIG. 4 represents an antenna according to a third embodiment of the invention.

FIG. 4 represents an antenna used in a third embodiment of the invention, of design relatively close to the antenna described with reference to FIG. 3.

Accordingly, as for the antenna described with reference to FIG. 3, the FIG. 4 antenna comprises a loop 46 formed by a single turn provided at its two ends 43, 44 with connecting lands to the electronic circuit.

Inside the area delimited by the loop 46, the antenna comprises a resonator 48 formed by a winding with free ends of about forty turns. Each turn is produced by four rectilinear portions.

The characteristics of the FIG. 4 antenna, intended for a card with dimensions 61 mm×40 mm, produce, as in the previous case, a resonant frequency close to 13.56 MHz. In fact, there are obtained here a resonator inductance $L_R$ of 122.113 µH, a resonator capacitance $C_R$ of 1.11 pF and thus a no-load resonant frequency of 13.653 MHz.

As for the FIG. 3 example, the antenna represented in FIG. 4 does not necessitate the placing of a looping bridge between elements of the antenna circuit.

A fourth embodiment of the invention is described next with reference to FIGS. 5 and 6.

Figure 5:
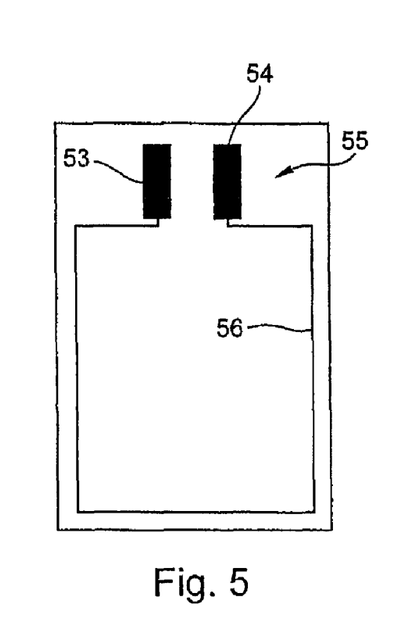
FIG. 5 represents a top view of a support carrying an antenna according to a fourth embodiment of the invention.

In this embodiment, a support 55 carries on a first face represented in FIG. 5 a loop 56 produced in the form of a single turn with connecting lands 53, 54 at each of its ends for connection with the electronic circuit of the electronic entity considered in this fourth embodiment.

Figure 6:
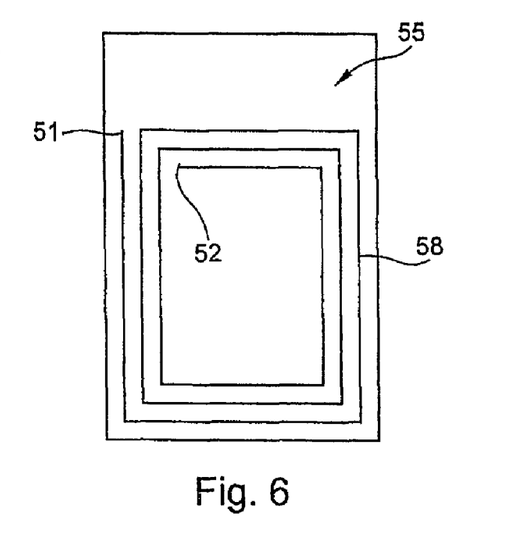
FIG. 6 represents a bottom view of the support from FIG. 5.

On a second face of the support 55, opposite the first face and represented in FIG. 6, the electronic entity receives a resonator 58 formed of rectilinear portions of conductive tracks that trace out a spiral (here formed with three turns) with free ends 51, 52.

The loop 56 and the resonator 58 are respectively positioned on the first face and the second face of the support 55 so that at least a substantial portion of the length of the loop 56 is located in line with the resonator 58, preferably in line with rectilinear portions of the resonator 58, for example exterior portions of the latter, or alternatively median portions of the latter (which enhances the phenomenon of capacitive coupling between the loop 56 and the resonator 58).

Thus certain portions of the resonator 58 and the loop 56 are separated only by the thickness of the dielectric material support 55 and the disposition that has just been referred to therefore also produces capacitive coupling between the loop 56 and the resonator 58.

If it is required to obtain a particularly efficient coupling, a thin support is used, for example a support less than 0.5 mm thick, even less than 0.3 mm thick, and even less than 0.15 mm thick.

The operation of the electronic entity that uses the antenna described with reference to FIGS. 5 and 6 follows from the same principles already described for the electronic entity of FIG. 1 with reference to FIG. 2.

Figure 7:
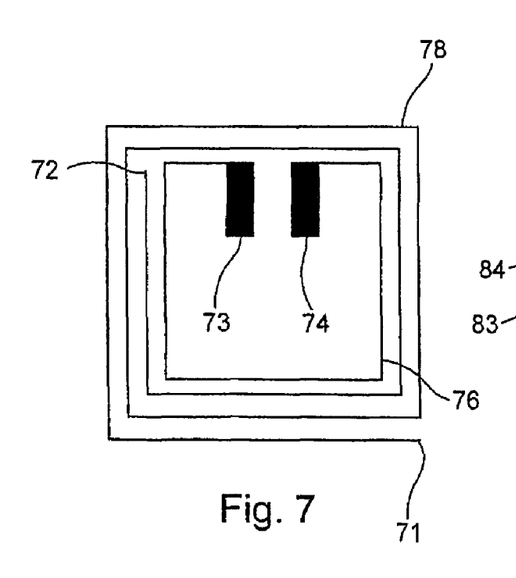
FIG. 7 represents a fifth embodiment of the invention.

FIG. 7 represents an antenna in a fifth embodiment of the invention.

That antenna includes a resonator 78 formed of a plurality of turns produced by means of rectilinear conductive track portions. The conductive track that traces out the resonator 78 thus forms a spiral with two free ends 71, 72.

Note here, as is the case in FIG. 7, that the number of turns that form the resonator is not necessarily an integer number, without this compromising the design or the physical operation of the antenna. Moreover, this remark applies equally to the other embodiments.

The interior turn of the resonator (i.e. the turn that terminates at one end in the free end 72) produces an area which, as seen clearly in FIG. 7, receives a loop 76 formed by a single turn intended to be connected to an electronic circuit by means of connecting lands 73, 74 each situated at one end of the turn.

The loop 76 is situated at a sufficiently small distance from the interior turn of the resonator 78 (over at least a portion of their perimeter, and in the example described here over all the perimeter of the turn forming the loop 76) so that capacitive coupling exists between the loop 76 and the resonator 78.

The operation of the antenna according to this fifth embodiment therefore follows from the same principles as for the preceding embodiments that have been explained with reference to FIGS. 1 and 2.

Figure 8:
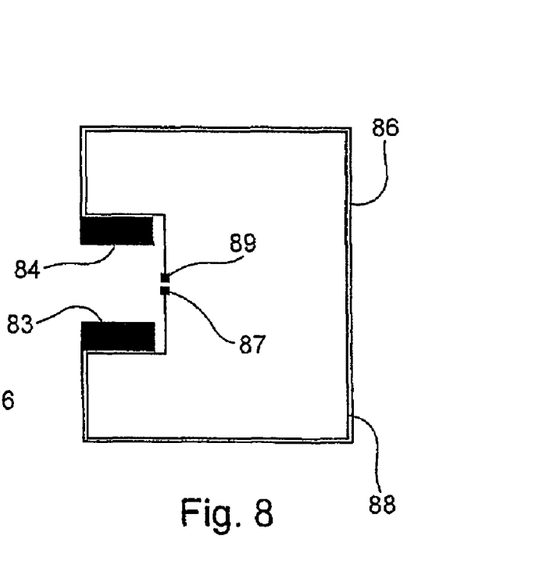
FIG. 8 represents an antenna according to a sixth embodiment of the invention.

FIG. 8 represents an antenna conforming to a sixth embodiment of the invention.

The antenna represented in FIG. 8 comprises a loop 86 that has at each of its ends a connecting land 83, 84.

The antenna also comprises a resonator 88 situated in the interior area defined by the turn 86.

The resonator is formed by a conductive track parallel to the loop 86 and situated at a small distance from the latter, and is extended on either side in the vicinity of the connecting lands 83, 84 as far as two face-to-face terminals 87, 89, also at a small distance from each other and each formed by a widening of the conductive track that forms the resonator 88.

The two terminals 87, 89 enable the connection of a capacitor the capacitive behavior whereof is added to the inductive behavior of the conductive track of the resonator that approximates a turn. These two conjugate effects produce the resonator effect.

Moreover, because of the proximity of the conductive track that forms the resonator 88 to the loop 86, on the one hand, and the connecting lands 83, 84, on the other hand, capacitive coupling exists between the loop 86 and the resonator 88.

The sixth embodiment therefore operates according to the same principles as the embodiments described hereinabove.

The embodiment described with reference to FIG. 8 achieves the following electrical characteristics for a card with dimensions 23.6 mm×20.4 mm by associating with the resonator a 1325 pF capacitor: resonator inductance 104.4 nH and therefore a no-load resonator frequency: 13.625 MHz.

Figure 9:
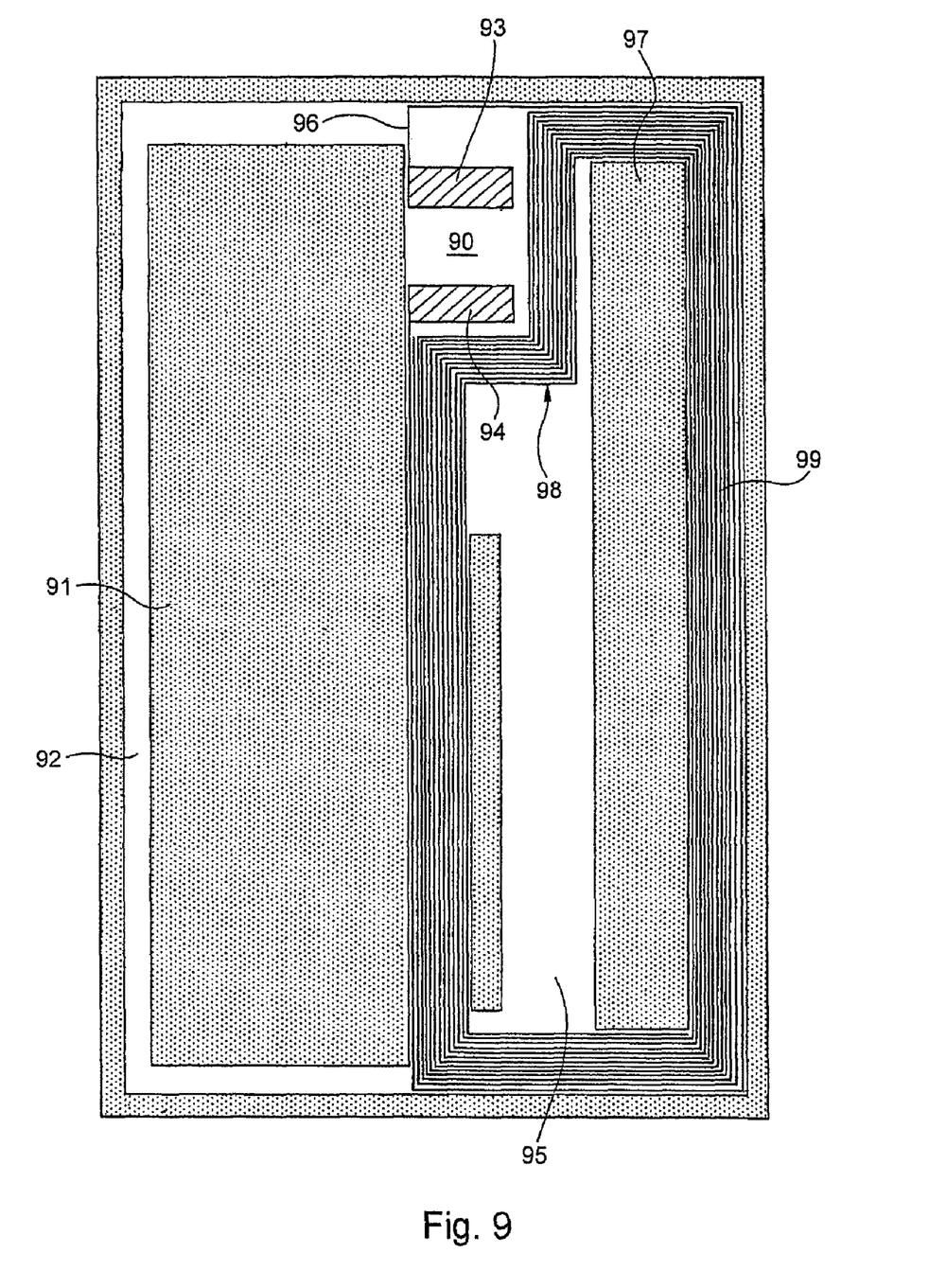
FIG. 9 represents an antenna according to a seventh embodiment of the invention.

FIG. 9 represents a bank card in which is implanted an antenna according to a seventh embodiment of the invention.

The card diagrammatically represented in FIG. 9 is an ID1 type card with dimensions 85.6 mm×54 mm.

FIG. 9 indicates areas of the card in which it is possible to implant electrical and electronic circuits (including an antenna of the microcircuit of the card for communication with the exterior) and the areas in which such implantation is impossible, for example because of mechanical loads subsequent to the assembly of the various layers of the card (typically by lamination), such as the embossing intended to produce inscriptions on the card.

Thus the card comprises in its vertical half represented on the left in FIG. 9 an embossing area 91 (in which implantation of the antenna is impossible) with dimensions that are large relative to the totality of this half, and which therefore leaves only a narrow area 92 for implantation of the antenna.

In its vertical half situated on the right in FIG. 9, the magnetic stripe that the card must carry defines a corresponding area 97 in which it is preferable to limit the implantation of electrical circuits.

This area corresponding to the magnetic stripe 97 nevertheless leaves, on either side, regions with relatively large dimensions where the implantation of electrical and electronic circuits is possible, namely a region 99 of elongate shape situated between the area corresponding to the magnetic stripe 97 and the right-hand edge of the card, and a main area 95 situated between the embossing area 91 and the area corresponding to the magnetic stripe 97.

Note that a small portion of the main area 95 cannot receive implanted electrical circuits as represented in FIG. 9. However, because of its small dimensions, this area does not call into question the explanations given hereinafter.

Note also that the main area 95 comprises an area 90 for implantation of the electronic circuit of the card.

When it is required to obtain a sufficient range for the ID1 card that has just been described, it is impossible to use the narrow area 92 because the latter can receive only a limited number of turns.

One is therefore constrained to implant the antenna in the vertical half (represented on the right in FIG. 9) that does not contain the embossing area 91, which nevertheless involves dividing the area of the antenna by two, and consequently, with the standard design, division by two of the magnetic flux used for telecommunication purposes.

It is proposed here, as seen in FIG. 9, to implant a loop 96 the perimeter of which approximately corresponds to that of the vertical half represented on the left in FIG. 9. The loop 96 therefore lies primarily in the main area 95 and, to a lesser degree, in the region 99 of elongate shape.

The loop 96 comprises a single turn connected at its two ends to the electronic circuit of the card by means of connecting lands 93, 94 that naturally lie in the implantation area 90.

It is further proposed to implant a resonator 98 in the interior of the loop 96.

The resonator is formed of rectilinear conductive track portions that form a spiral winding with free ends.

Just like the loop 96, the resonator 98 extends primarily over the area of the main regions 95 and the region 99 of elongate shape.

Here the resonator 98 is obtained by spiral winding conductive wires 0.112 mm wide with an interturn width of 0.088 mm.

The resonator 98 therefore amplifies signals at the communication frequency of the electronic circuit (here 13.56 MHz), the signals being further exchanged between the resonator 98 and the loop 96 by capacitive coupling between these two elements, as already described for the preceding embodiments.

Although the exterior dimensions of the antenna (namely the loop 96 here) are small (here slightly less than half the area of the ID1 card), sufficient sensitivity of the antenna is nevertheless obtained, and thus a sufficient range of the card in remote operation.

Figure 10:
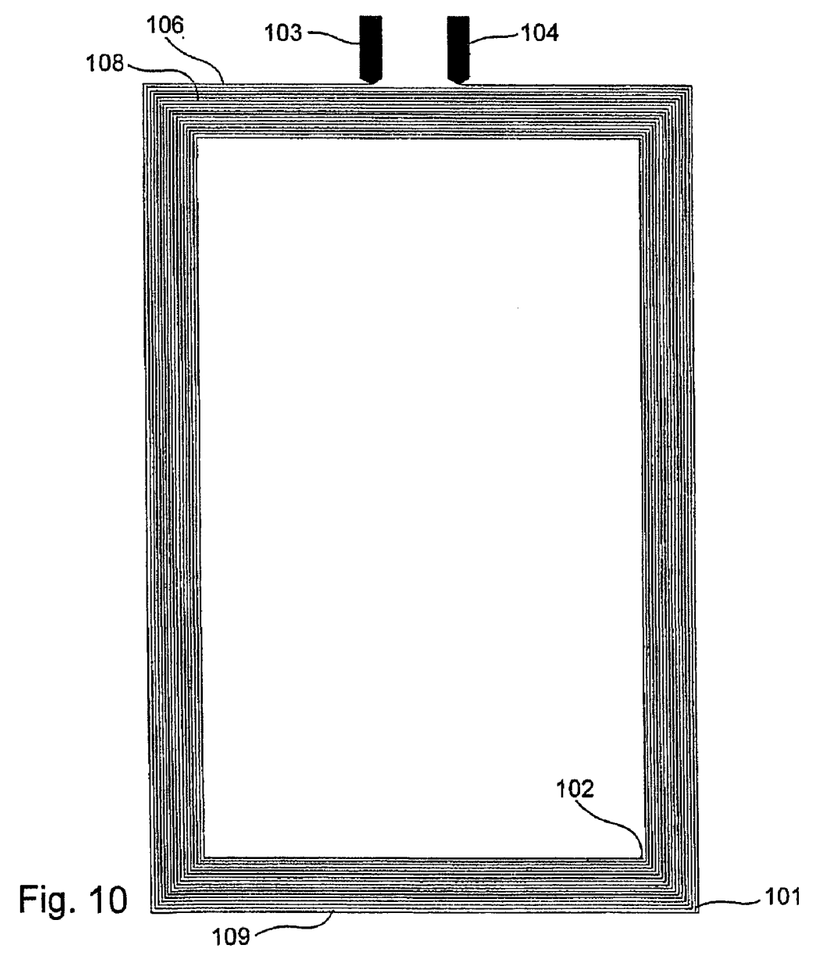
FIG. 10 represents an antenna according to an eighth embodiment of the invention.

FIG. 10 represents an antenna according to an eighth embodiment of the invention.

This antenna consists on the one hand of a loop 106 having a single turn and connecting lands 103, 104 to the electronic circuit of the electronic entity considered here and on the other hand a resonator 108 formed of a spiral winding of a plurality of turns (here about 20 turns), the two ends 101, 102 of the winding being left free. As described with reference to FIG. 1, the exterior turn of the resonator 108 is sufficiently close (specifically furthermore parallel at each point) to the loop 106 to produce capacitive coupling between the loop 106 and the resonator 108.

This embodiment further includes a conductive element 109 with small dimensions (such as a conductive track portion) connecting the resonator 98 and the loop 96 directly. This conductive element 99 can slightly modify the electrical characteristics of the circuit (for example for better adaptation to the communication frequency of the electronic circuit used), but does not call into question the operating principles of the antenna according to the invention as described primarily with reference to FIGS. 1 and 2.

Figure 11:
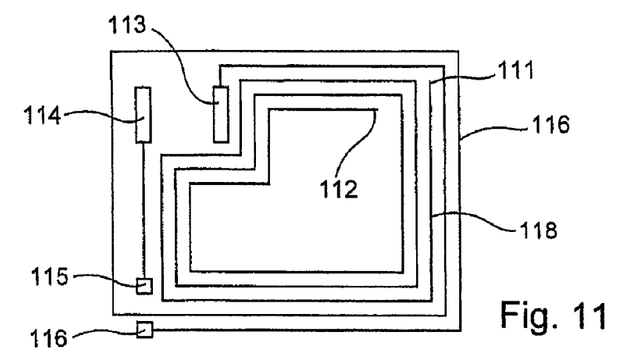
FIG. 11 represents an antenna according to a ninth embodiment of the invention.

FIG. 11 represents an antenna for an electronic entity according to a ninth embodiment of the invention.

The antenna represented in FIG. 11 comprises a loop 116 formed, when the electronic entity is assembled, from a winding of two turns: the two turns are formed by conductive tracks deposited in the same plane and intended to be connected to the electronic circuit of the electronic entity by connecting lands 113, 114; the looping of the loop 16 is effected in the electronic entity by means of a bridge that enables one turn to straddle the other at the level of the contact terminals 115, 116 of the bridge.

The antenna further comprises a resonator 118 formed of conductive tracks situated in the same plane and that trace out a spiral general shape with free ends 111, 112.

The exterior turn of the resonator 118 is sufficiently close over the greater part of its periphery to at least one of the turns of the loop 116 to generate capacitive coupling between the loop 116 and the resonator 118, to obtain operation of the antenna represented in FIG. 6 in accordance with the same principle as those described with reference to FIGS. 1 and 2.

In this embodiment, the aim was to use a loop 116 with a plurality of turns (here two turns), which made it necessary to use a bridge. However, thanks to the resonator 118, it has been possible to reduce the number of turns of the loop 116, which solves implantation problems, for example. This solution is in fact satisfactory in particular when the number of turns connected to the electronic circuit (i.e. to the connecting lands 113, 114) must be limited but the area defined inside those turns can be used.

What is more, for the same area and the same number of turns, the presence of the resonator increases the range of the electronic entity relative to an electronic entity with no such resonator.

Figure 12:
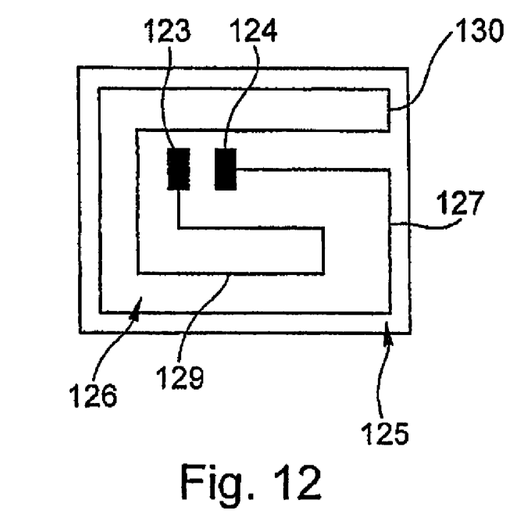
FIG. 12 represents a first portion of an antenna according to a tenth embodiment of the invention.
Figure 13:
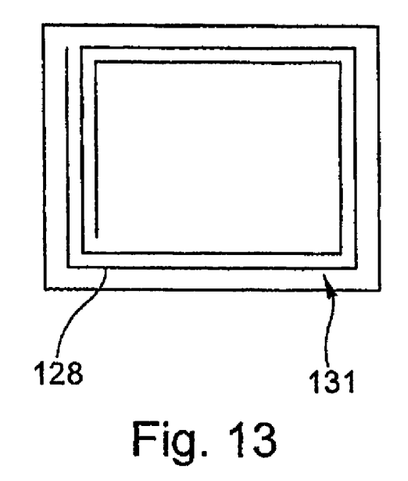
FIG. 13 represents a second portion of the antenna in the tenth embodiment of the invention.

FIGS. 12 and 13 represent an antenna produced inside a microcircuit card on two layers of that card respectively represented in FIGS. 12 and 13.

There is deposited on a first layer 125 of the microcircuit card a loop 126 adapted to be connected to the electronic circuit of the card by means of connecting lands 123, 124 situated substantially at the center of the area of the first layer 125.

From the connecting land 124 extends in a spiral a first strand 127 of the loop 126, referred to hereinafter as the exterior strand. The exterior strand 127 comprises a rectilinear portion that extends essentially between the connecting land 124 and an edge of the card and four rectilinear portions that extend over virtually all the perimeter of the card, at a small distance from the edge of the latter.

The second strand 129 of the loop 126 extends in a spiral from the connecting land 123, inside the spiral formed by the exterior strand 127. Because of this the second strand 129 is referred to as the interior strand.

The exterior strand 127 and the interior strand 129 are connected to each other at their ends opposite the connecting land 123, 124 by a connecting portion 130. The loop 126 is therefore able to form, with the electronic circuit of the card, a closed circuit.

Note that the various spacings between the various conductive track portions forming the loop 126 (i.e. the spacing between the two strands) are (taken two by two) of the same order of magnitude, and substantially equal two by two in each direction, in order on the one hand to limit the formation of interturn capacitances and, on the other hand, to provide a sufficient area inside the loop 126.

On a second layer 131 represented in FIG. 13 the microcircuit card carries a resonator 128 formed of the spiral winding of a conductive track with free ends (formed here of a little more than two turns).

The first layer 125 and the second layer 131 are sufficiently close for capacitive coupling to exist between the resonator 128 and the loop 126 and in particular its exterior strand 127 which in the example given here is disposed substantially in line with the turns that form the resonator 128.

There is obtained in this way operation of the type described in principle with reference to FIGS. 1 and 2.

Figure 14:
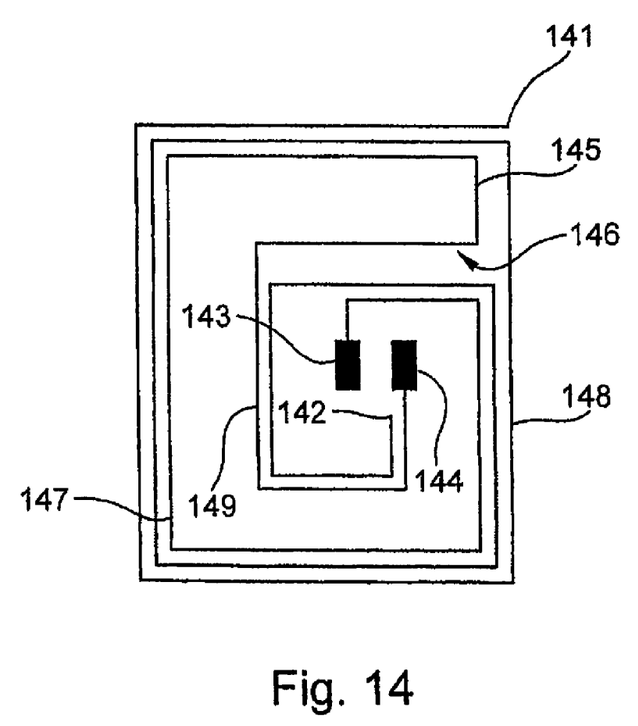
FIG. 14 represents an antenna according to an eleventh embodiment of the invention.

FIG. 14 represents an antenna used in an eleventh embodiment of the invention.

This antenna comprises a loop 146 formed of an exterior strand 147 and an interior strand 149.

Each strand 147, 149 extends in a spiral from a connecting land 143, 144 situated substantially at the center of the card.

The exterior strand 147 is formed by a spiral that extends in particular over virtually all the perimeter of the card (generally more than ¾ of that perimeter, and here more than ⅞ of that perimeter). Because of this in particular, the exterior strand 147 extends, as seen from the connecting land 143, over more than one turn (i.e. over more than 360°). In other words, any (imaginary) ray originating from the connecting land 143 has at least one intersection with the exterior strand 147.

The interior strand 149 extends in a spiral from the connecting land 144 and inside the area delimited by the exterior strand 147, so that it is interlaced with the exterior strand 147.

The exterior strand 147 and the interior strand 149 are connected, at their end opposite their respective connecting land 143, 144, by a connecting portion 145 and thus form a plane closed circuit when the electronic circuit is connected to the connecting lands 143, 144.

The antenna also comprises a resonator 148 formed by a spiral wound conductive track with free ends 141, 142.

The resonator 148 comprises about two turns wound around the loop 146, one turn of which is at a small distance from the exterior strand 147 of the loop 146 over virtually all the perimeter of the card. The resonator 148 also comprises a second portion electrically connected to the first and which is wound in a spiral inside the loop 146, partly in the vicinity of the exterior strand 147 and partly in the vicinity of the interior strand 149, almost as far as the connecting land of the latter.

The proximity of the resonator 148 and the loop 146 over an important portion of the length of the loop 146 enables capacitive coupling between the resonator 148 and the loop 146 and therefore operation as already given in principle with reference to FIGS. 1 and 2.

Figure 15:
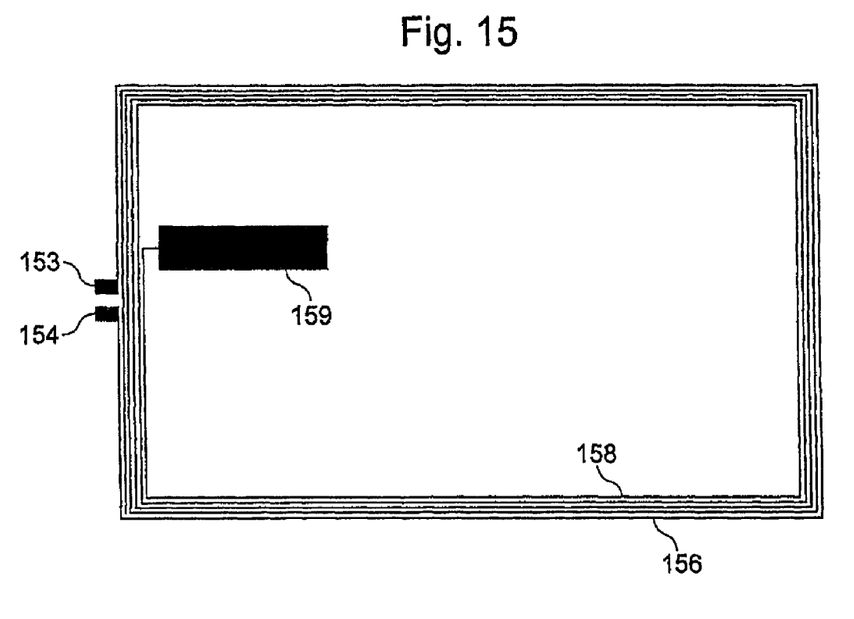
FIG. 15 represents a first portion of an antenna according to a twelfth embodiment of the invention.
Figure 16:
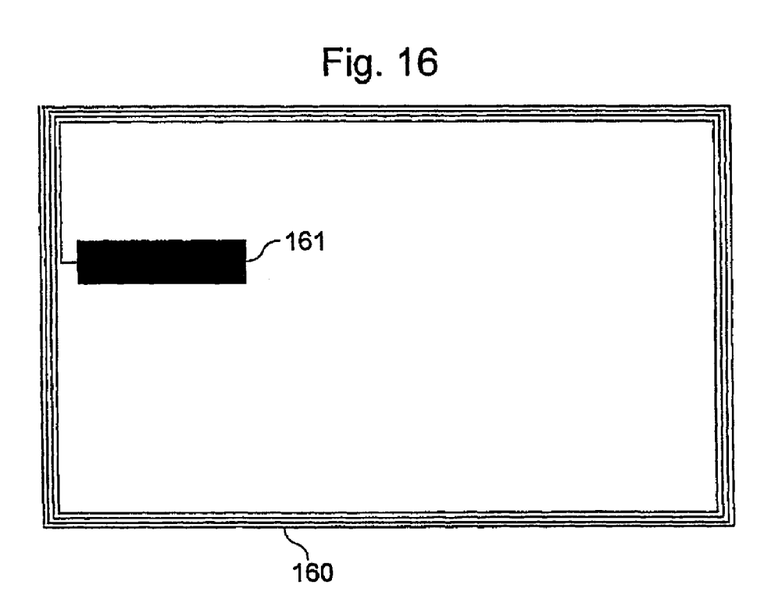
FIG. 16 represents a second portion of the antenna in the twelfth embodiment of the invention.

FIGS. 15 and 16 represent an antenna produced within a microcircuit card on two layers of that card respectively represented in FIGS. 15 and 16.

There is deposited on a first layer (represented in FIG. 15) a loop 156 adapted to be connected to the electronic circuit of the card by means of connecting lands 153, 154 to form, with the electronic circuit of the card, a closed circuit.

The first layer also carries a first portion 158 of a resonator produced in the form of a winding with free ends, and here situated inside the loop 156. The exterior turn of this first portion 158 is situated at a small distance from the loop 156 to enable capacitive coupling between these two elements.

The end of the first portion 158 opposite its external turn terminates in a first metallic land 159 forming an armature as described hereinafter.

On a second layer represented in FIG. 16, the microcircuit card carries a second portion 160 of the resonator, also formed of a spiral-wound conductive track with free ends. At one of its ends (here its internal end), the second portion 160 is terminated by a second metallic land 161 forming an armature.

Note in this connection that FIGS. 15 and 16 represent the various windings seen from the same direction, so that the first metallic land 159 is situated in line with the second metallic land 161.

The first layer and the second layer are moreover sufficiently close for there to be capacitive coupling between the first portion 158 of the resonator and its second portion 160, in particular at the level of the first and second metallic lands 159, 161 situated face to face and therefore forming a capacitor.

It will be noted that the embodiment described here provides a winding in the opposite direction of the two resonator portions 158, 160. Alternatively, the same winding direction could be used for both portions.

The examples that have just been given naturally represent only possible embodiments of the invention.

The electronic entity can in particular be other than a microcircuit card, such as a personal digital assistant or an electronic passport, for example.

The invention claimed is:

1. An electronic entity, comprising:
   an electronic circuit to which is connected an antenna, wherein the antenna comprises a loop electrically connected to the electronic circuit and a resonator formed of a conductive winding with free ends coupled to said loop,
   the loop being produced in a first plane,
   the resonator being produced in a second plane different from the first plane, and
   the resonator is in line with the loop.

2. The electronic entity according to claim 1, wherein the resonator is capacitively coupled to the loop.

3. The electronic entity according to claim 2, wherein the resonator comprises a turn facing the loop over at least a portion of a perimeter of the loop.

4. The electronic entity according to claim 3, wherein the turn faces the loop over virtually all the perimeter of the loop.

5. The electronic entity according to claim 3, wherein the turn and the loop are situated at a distance less than 0.5 mm over said perimeter portion.

6. The electronic entity according to claim 1, wherein the loop forms a conductive circuit connected at each of its ends to a terminal of the electronic circuit.

7. The electronic entity according to claim 1, wherein said conductive winding comprises a plurality of turns.

8. The electronic entity according to claim 7, wherein the turns are separated two by two by a distance less than 0.5 mm.

9. The electronic entity according to claim 1, wherein a median turn of the resonator is placed in line with the loop.

10. The electronic entity according to claim 1, wherein a resonant frequency of the resonator alone is at most 10% higher than a communication frequency of the electronic circuit.

11. The electronic entity according to claim 1, wherein the antenna is a magnetic antenna.

12. The electronic entity according to claim 1, wherein the electronic circuit operates at a communication frequency below 100 MHz.

13. The electronic entity according to claim 12, wherein said communication frequency is between 1 MHz and 50 MHz.

14. The electronic entity according to claim 13, wherein said communication frequency is between 13 MHz and 15 MHz.

15. The electronic entity according to claim 14, wherein the resonant frequency of the resonator alone is between 13.6 MHz and 17 MHz.

16. The electronic entity according to claim 1, having exterior dimensions less than 100 mm.

17. The electronic entity according to claim 16, wherein the resonator comprises more than ten turns.

18. The electronic entity according to claim 16, wherein said exterior dimensions are less than 30 mm.

19. The electronic entity according to claim 1, wherein the electronic entity is a pocket electronic entity.

20. The electronic entity according to claim 1, wherein the electronic entity is a microcircuit card.

21. The electronic entity according to claim 20, wherein the antenna extends over about half an area of the card.

22. The electronic entity according to claim 1, wherein the resonator has a Q enabling amplification at a communication frequency of the electronic circuit.

* * * * *

UNITED STATES PATENT AND TRADEMARK OFFICE
CERTIFICATE OF CORRECTION

PATENT NO.       : 8,378,911 B2
APPLICATION NO.  : 11/920970
DATED            : February 19, 2013
INVENTOR(S)      : Eray et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1413 days.

Signed and Sealed this
First Day of September, 2015

Michelle K. Lee
*Director of the United States Patent and Trademark Office*